US012578206B1

(12) United States Patent
Nakagawa et al.

(10) Patent No.: US 12,578,206 B1
(45) Date of Patent: Mar. 17, 2026

(54) ROAD CONDITION MONITORING SYSTEM

(71) Applicant: Samsara Inc., San Francisco, CA (US)

(72) Inventors: Kenshiro Nakagawa, San Francisco, CA (US); Caglar Iskender, Redmond, WA (US); Tina Quach, Cupertino, CA (US); Salil Gupta, Bethesda, MD (US); Samuel Goldman, Silver Spring, MD (US); Meelap Shah, Portland, OR (US); Pang Wu, San Francisco, CA (US); Jovanna Bubar, Los Angeles, CA (US); John Charles Bicket, Burlingame, CA (US); Aravindh Ramesh, San Francisco, CA (US); Gerrit Steinbach, Toronto (CA); Jennifer Nguyen, New York, NY (US)

(73) Assignee: Samsara Inc., San Francisco, CA (US)

( * ) Notice: Subject to any disclaimer, the term of this patent is extended or adjusted under 35 U.S.C. 154(b) by 0 days.

(21) Appl. No.: 19/091,677

(22) Filed: Mar. 26, 2025

(51) Int. Cl.
| | |
|---|---|
| *G01C 21/36* | (2006.01) |
| *G01C 21/00* | (2006.01) |
| *G06V 10/70* | (2022.01) |
| *G06V 10/98* | (2022.01) |
| *G06V 20/56* | (2022.01) |
| *G06V 20/62* | (2022.01) |
| *G06V 40/16* | (2022.01) |

(52) U.S. Cl.
CPC ..... *G01C 21/3841* (2020.08); *G01C 21/3815* (2020.08); *G06V 10/70* (2022.01); *G06V 10/993* (2022.01); *G06V 20/588* (2022.01); *G06V 20/625* (2022.01); *G06V 40/161* (2022.01); *G06V 2201/09* (2022.01)

(58) Field of Classification Search
CPC .......... G08G 1/20; G08G 1/202; G08G 1/205; G08G 1/207; G05D 1/0291; G05D 1/0297
See application file for complete search history.

(56) References Cited

U.S. PATENT DOCUMENTS

| | | | | |
|---|---|---|---|---|
| 11,365,980 B1 * | 6/2022 | Akhtar | ............... | G01C 21/3804 |
| 2018/0188037 A1 * | 7/2018 | Wheeler | .............. | G06V 20/582 |

FOREIGN PATENT DOCUMENTS

WO | WO-2023244513 A1 * | 12/2023 | ............. | G06F 21/62

* cited by examiner

*Primary Examiner* — Kenneth J Malkowski
(74) *Attorney, Agent, or Firm* — Schwegman Lundberg & Woessner, P.A.

(57) ABSTRACT

Systems and methods for providing real-time road condition information using a network of sensor-equipped vehicles. The system includes a plurality of vehicles equipped with dash cameras and other sensors that collect road condition data. A spatiotemporal index maintains processed sensor data associated with road segments, where personally identifiable information is removed and data quality is validated. The system analyzes the sensor data to detect various road network conditions including weather conditions, construction zones, and infrastructure status. The system monitors data freshness and automatically triggers collection of updated data when existing data exceeds age thresholds. User account information customizes the display of road conditions based on vehicle types and regulatory requirements.

20 Claims, 8 Drawing Sheets

200

ROAD CONDITION MONITORING SYSTEM
124

PROCESSORS
208

DATA COLLECTION MODULE 202

DATA PROCESSING  MODULE 204

ANALYSIS MODULE 206

PRESENTATION MODULE 208

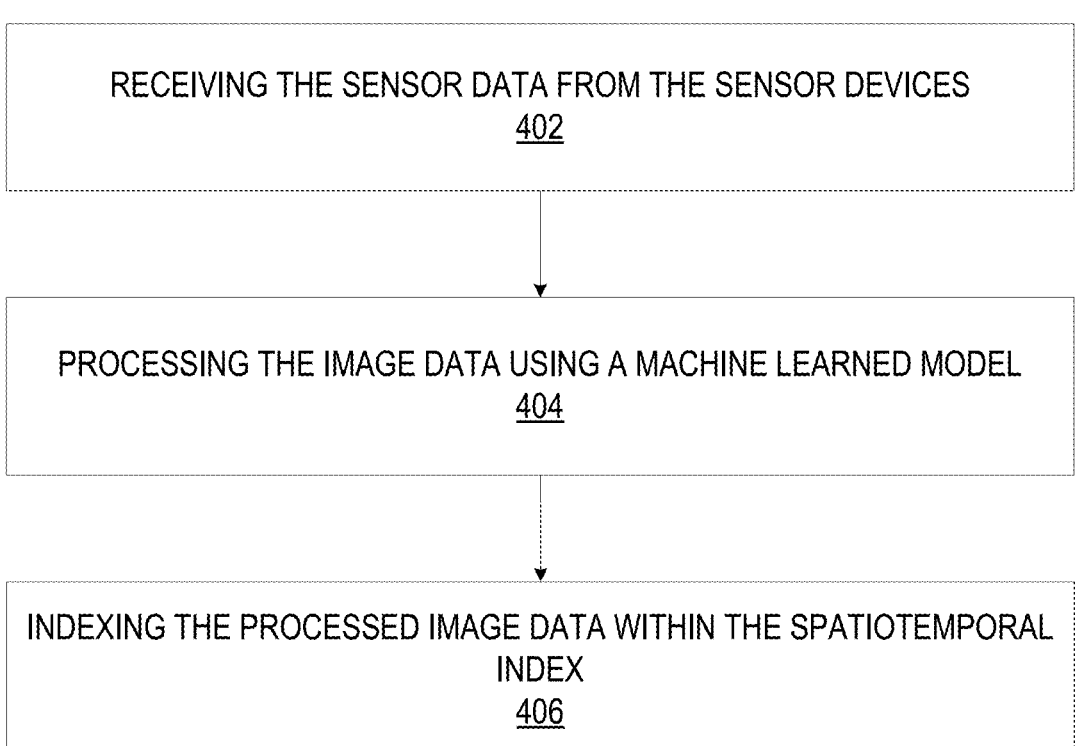
RECEIVING THE SENSOR DATA FROM THE SENSOR DEVICES
402
PROCESSING THE IMAGE DATA USING A MACHINE LEARNED MODEL
404
INDEXING THE PROCESSED IMAGE DATA WITHIN THE SPATIOTEMPORAL
INDEX
406
*FIG. 4*

500

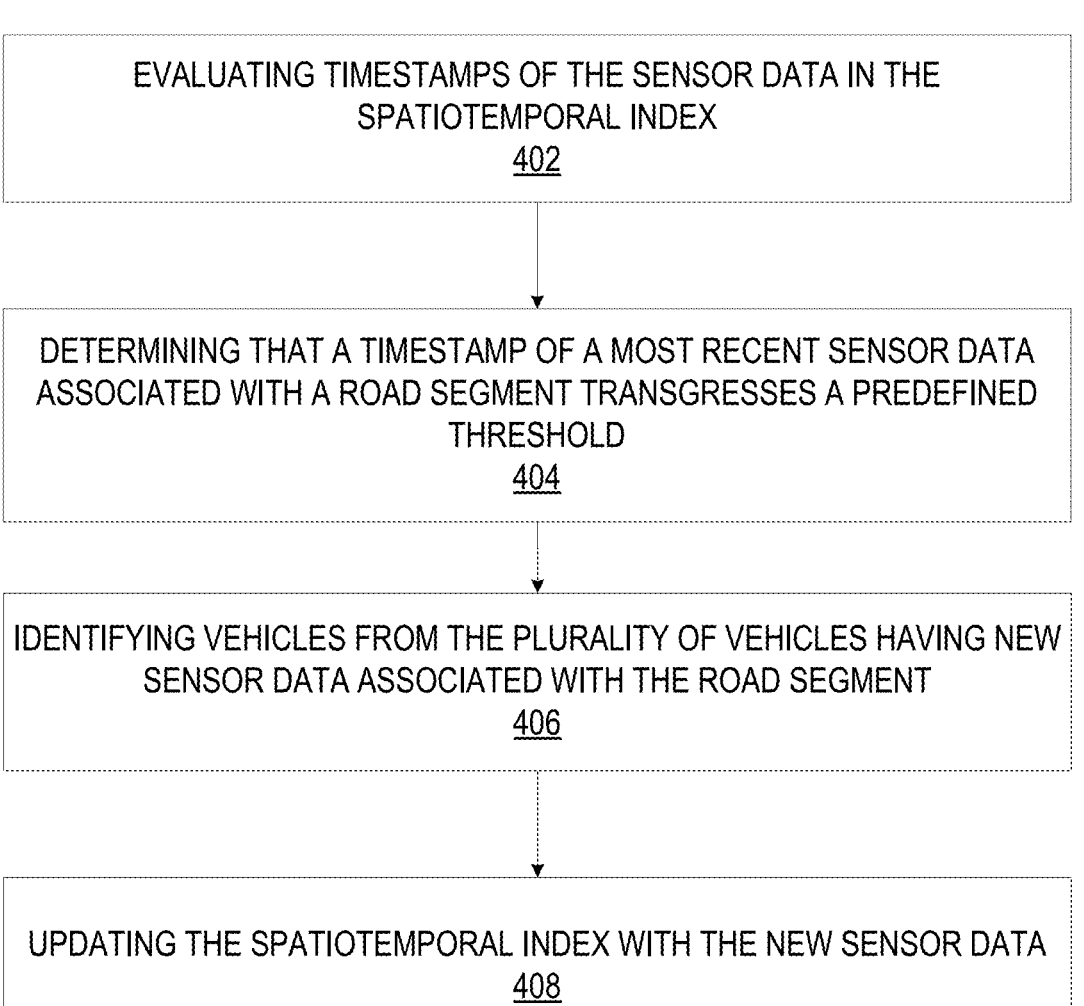

EVALUATING TIMESTAMPS OF THE SENSOR DATA IN THE SPATIOTEMPORAL INDEX
402

DETERMINING THAT A TIMESTAMP OF A MOST RECENT SENSOR DATA ASSOCIATED WITH A ROAD SEGMENT TRANSGRESSES A PREDEFINED THRESHOLD
404

IDENTIFYING VEHICLES FROM THE PLURALITY OF VEHICLES HAVING NEW SENSOR DATA ASSOCIATED WITH THE ROAD SEGMENT
406

UPDATING THE SPATIOTEMPORAL INDEX WITH THE NEW SENSOR DATA
408

*FIG. 5*

ROAD CONDITION MONITORING SYSTEM

TECHNICAL FIELD

Embodiments of the present invention relates generally to road condition monitoring systems, and more particularly to systems and methods for providing real-time road condition information.

BACKGROUND

In modern transportation and fleet management, understanding road conditions and potential hazards is critical for safety and operational efficiency. Traditional methods of monitoring road conditions have relied heavily on fixed infrastructure like stationary cameras and weather stations, which provide limited coverage and often delayed information.

State transportation agencies currently maintain fixed cameras at specific locations like mountain passes to monitor conditions. However, these static monitoring points leave significant gaps in coverage, particularly for rapidly changing conditions or areas without permanent monitoring infrastructure.

Current approaches for road maintenance and safety monitoring are resource-intensive and inefficient. For example, public sector entities must employ dedicated drivers to physically inspect every road in a city to identify maintenance needs such as potholes or road striping issues. This manual inspection process is time-consuming, costly, and provides only periodic snapshots of road conditions.

Weather conditions pose particular challenges for fleet operations and road safety. Existing systems struggle to provide timely, accurate information about localized conditions such as ice, snow, or flooding that can impact vehicle operations. Fleet operators must often rely on general weather forecasts that may not reflect actual conditions at specific locations.

Additionally, current methods for identifying and communicating road hazards like construction zones, lane closures, or stalled vehicles typically depend on manual reporting systems or crowd-sourced data. These approaches can result in delayed notifications and incomplete coverage, particularly in less-traveled areas.

The limitations of existing road monitoring systems create significant challenges for fleet operators, government agencies, and other stakeholders who require accurate, current information about road conditions to make operational decisions and ensure safety. There remains a need for more comprehensive, timely, and accurate methods of monitoring and communicating road conditions.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4 is a flowchart depicting a method of processing and indexing sensor data within a road condition monitoring system.

FIG. 5 is a flowchart depicting a method of maintaining data freshness within a road condition monitoring system, according to certain examples.

DETAILED DESCRIPTION

Figure 1:
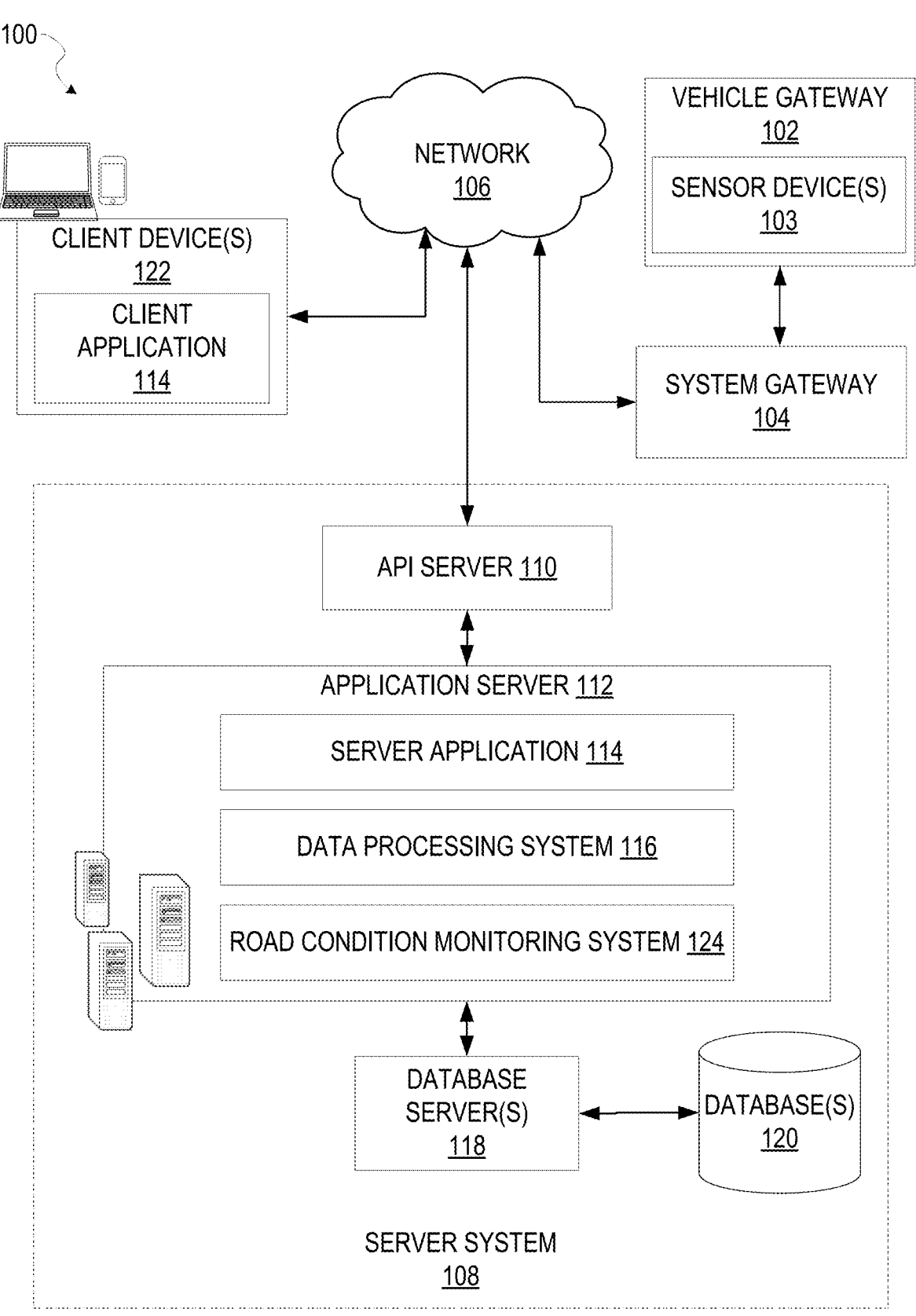
FIG. 1 is a block diagram showing an example system for monitoring road conditions using sensor data, according to certain example examples.

Transportation and logistics companies face significant challenges in obtaining accurate, real-time information about road conditions that affect their operations. While existing mapping solutions may provide basic traffic and construction information based on explicit inputs that identify such conditions, they lack the comprehensive, up-to-date visibility needed for effective fleet management and route planning. Fleet operators need timely information about weather conditions, road hazards, and infrastructure status to ensure safe and efficient operations, particularly for specialized vehicles subject to specific regulatory requirements.

According to certain examples, the present disclosure describes systems and methods for providing real-time road condition information through a distributed network of sensor-equipped vehicles. By leveraging data from one or more vehicles equipped with dash cameras and other sensors, the system provides visibility into current road conditions across a geographic area.

In some examples, the system maintains a spatiotemporal index of processed sensor data, allowing storage and retrieval of road condition information based on location and time. The system may apply various preprocessing techniques to ensure data privacy by removing personally identifiable information while also maintaining high data quality through automated filtering.

In some examples, the system may analyze the collected sensor data, to detect various road network conditions including weather conditions, construction zones, road surface conditions, and infrastructure status. For example, this analysis may employ machine learning models trained to identify specific conditions and hazards from image data and other sensor inputs.

In some examples, the system may generate and cause display of a map interface that displays detected conditions through graphical indicators. For example, users can select specific geographic areas and access detailed condition information through interactive map elements. The display may be customized based on user account information to ensure that the presented conditions are relevant to specific vehicle types and regulatory requirements.

In some examples, to maintain data freshness, the system continuously monitors the age of stored sensor data. When data for a particular road segment exceeds predetermined age thresholds, the system automatically triggers collection of updated information from vehicles in the relevant area.

Integration with severe weather alert systems enables proactive notification of weather-related hazards. The system can automatically adjust detection sensitivity based on conditions, increasing monitoring frequency in areas experiencing severe weather or other hazardous conditions.

The system's architecture includes both cloud-based processing for data analysis and storage, and edge processing capabilities in vehicle-mounted devices. This distributed approach enables efficient data collection and preprocessing while maintaining network efficiency.

Privacy and data quality are ensured through automated preprocessing pipelines that remove personally identifiable information, evaluate image quality, and filter irrelevant content. This preprocessing ensures that shared road condition information maintains user privacy while providing actionable insights for fleet operators.

FIG. 1 is a block diagram showing an example system 100 for monitoring road conditions using sensor data, according to certain example examples. The system 100 includes one or more client devices 122 that host a number of applications including a client application 114.

Accordingly, each client application 114 is able to communicate and exchange data with another client application 114 and with the server application 114 executed at the server system 108 via the network 106. The data exchanged between client applications 114, and between a client application 114 and the server system 108, includes functions (e.g., commands to invoke functions) as well as payload data (e.g., text, audio, video or other multimedia data).

The server system 108 provides server-side functionality via the network 106 to a particular client application 114, and in some embodiments to the vehicle gateway 102 and the system gateway 104. While certain functions of the system 100 are described herein as being performed by either a client application 114, the vehicle gateway 102, the system gateway 104, or by the server system 108, it will be appreciated that the location of certain functionality either within the client application 114 or the server system 108 is a design choice. For example, it may be technically preferable to initially deploy certain technology and functionality within the server system 108, but to later migrate this technology and functionality to the client application 114, or one or more processors of the vehicle gateway 102, or system gateway 104, where there may be sufficient processing capacity.

The server system 108 supports various services and operations that are provided to the client application 114. Such operations include transmitting data to, receiving data from, and processing data generated by the client application 114, the vehicle gateway 102, and the system gateway 104. The vehicle gateway 102 includes sensor devices 103 comprising dash cameras, accelerometers, and other sensors configured to collect road condition data. In some embodiments, this data includes image data, road surface condition data, weather condition data, construction zone data, and infrastructure status data. Data exchanges within the system 100 are invoked and controlled through functions available via graphical user interfaces (GUIs) of the client application 114.

Turning now specifically to the server system 108, an Application Program Interface (API) server 110 is coupled to, and provides a programmatic interface to, an application server 112. The application server 112 is communicatively coupled to a database server 118, which facilitates access to a database 120 that stores data associated with data generated by the vehicle gateway 102 and processed by the application server 112. In some examples, the database 120 may include a spatiotemporal index.

Dealing specifically with the API server 110, this server receives and transmits data (e.g., sensor data, commands, and payloads) between the client device 122 and the application server 112. Specifically, the API server 110 provides a set of interfaces (e.g., routines and protocols) that can be called or queried by the client application 114 in order to invoke functionality of the application server 112. The API server 110 exposes various functions supported by the application server 112, including account registration, login functionality, the transmission of data, via the application server 112, from a particular client application 114 to another client application 114, the sending of sensor data (e.g., images, video, geolocation data, inertial data, temperature data, etc.) from a client application 114 to the server application 114, and for possible access by another client application 114, the setting of a collection of data, the retrieval of such collections, the retrieval of data, and the location of devices within a region.

The application server 112 hosts a number of applications and subsystems, including a server application 114, and a road condition monitoring system 124. The road condition monitoring system 124 is configured to maintain a spatiotemporal index of sensor data, analyze the sensor data to detect road network conditions, and generate map overlays comprising graphical indicators that represent the detected road network conditions. Further details of the road condition monitoring system 124 can be found in FIG. 2 below.

The server application 114 implements a number of data processing technologies and functions, particularly related to the processing of sensor data generated by the sensor devices 103 of the vehicle gateway 102. The sensor data is processed to remove personally identifiable information and evaluate quality metrics before being stored in the spatiotemporal index. Other processor and memory intensive processing of data may also be performed server-side by the server application 114, in view of the hardware requirements for such processing.

The application server 112 is communicatively coupled to a database server 118, which facilitates access to a database 120 in which is stored data associated with sensor data generated by the vehicle gateway 102 and processed by the server application 114.

Figure 2:
FIG. 2 is a block diagram illustrating components of the road condition monitoring system that configure the road condition monitoring system to perform operations to monitor road conditions using sensor data, according to certain examples

FIG. 2 is a block diagram 200 illustrating components of the road condition monitoring system 124 that configure the road condition monitoring system 124 to perform operations to monitor road conditions using sensor data, according to certain examples. The road condition monitoring system 124 is shown to include multiple modules configured to perform specialized functions related to processing and analyzing sensor data to detect and display road network conditions.

The data collection module 202 is configured to receive sensor data from sensor devices equipped within a plurality of vehicles. The data collection module 202 manages the collection of image data from dash cameras, accelerometer data for detecting road surface conditions, and other sensor inputs. The module coordinates data collection frequency and coverage, including triggering additional data collection when needed.

The data processing module 204 performs preprocessing operations on the received sensor data. These operations include removing personally identifiable information such as faces, license plates and company logos from image data, evaluating quality metrics to filter out poor quality captures, and cropping irrelevant portions of images. The processed data is stored in a spatiotemporal index (i.e., the database 120) that maintains temporal and geospatial relationships.

The analysis module 206 analyzes the processed sensor data to detect various road network conditions. The module employs machine learning models to identify weather conditions, construction zones, road surface conditions, and infrastructure status. The analysis module 206 also monitors data freshness and triggers collection of updated data when existing data exceeds predetermined age thresholds.

The presentation module 208 generates map overlays comprising graphical indicators that represent the detected road network conditions. The module customizes the display based on user account information, including vehicle types and regulatory requirements. The presentation module 208 enables interactive access to the underlying sensor data through selectable map elements and manages the display of alerts and notifications.

The processors 208 execute instructions to implement the functionality of the various modules described above. The processors 308 coordinate the flow of data between modules and manage system resources to ensure efficient operation of the road condition monitoring system 124.

Figure 3:
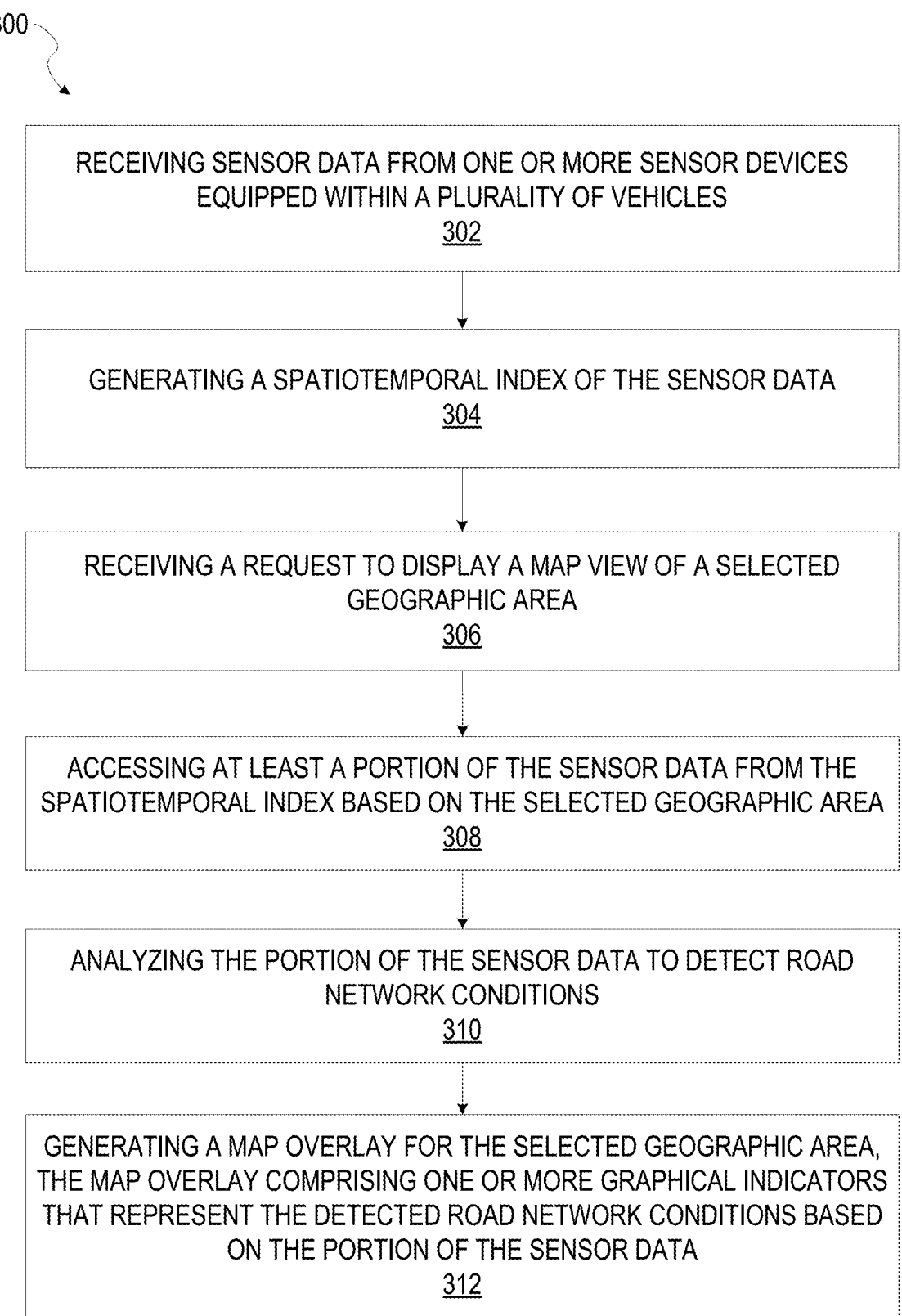
FIG. 3 is a flowchart depicting a method of monitoring road conditions using sensor data collected from a plurality of vehicles, according to certain examples.

FIG. 3 is a flowchart depicting a method 300 of monitoring road conditions using sensor data collected from a plurality of vehicles, according to certain examples. Operations of the method 300 may be performed by the modules described above with respect to FIG. 2. As shown, the method 300 includes one or more operations for processing sensor data to detect and display road network conditions.

At operation 302, the data collection module 202 receives sensor data from one or more sensor devices equipped within a plurality of vehicles. The sensor devices include dash cameras configured to capture image data of road conditions and accelerometers configured to detect road surface conditions. The sensor data is collected continuously as vehicles traverse road networks, with increased collection frequency in areas experiencing severe weather or other hazardous conditions.

At operation 304, the data processing module 204 generates a spatiotemporal index of the sensor data. The spatiotemporal index maintains temporal and geospatial relationships between processed sensor data and corresponding road segments. According to certain examples, before indexing, the sensor data is preprocessed to remove personally identifiable information, evaluate quality metrics, and filter out poor quality captures.

At operation 306, the presentation module 208 receives a request to display a map view of a selected geographic area. The request may include user account information comprising vehicle specifications and regulatory requirements that determine which road network conditions are relevant to display. The system customizes the display based on vehicle types, such as showing railroad crossing requirements for school buses and hazmat vehicles.

At operation 308, the system accesses at least a portion of the sensor data from the spatiotemporal index based on the selected geographic area. The system evaluates data freshness and may trigger collection of updated data when existing data exceeds predetermined age thresholds. For example, for highways, the system may maintain a data freshness of one hour.

At operation 310, the analysis module 206 analyzes the portion of sensor data to detect road network conditions. The analysis employs machine learning models to identify weather conditions, construction zones, road surface conditions, and infrastructure status. Detection sensitivity may be dynamically adjusted based on conditions, such as increasing sensitivity in areas with severe weather.

At operation 312, the presentation module 208 generates a map overlay for the selected geographic area. The map overlay comprises graphical indicators that represent the detected road network conditions based on the analyzed portion of sensor data. The indicators may be color-coded to show condition severity and made selectable to enable access to underlying sensor data. The display is customized based on user account information to show conditions relevant to specific vehicle types and regulatory requirements.

FIG. 4 is a flowchart depicting a method 400 of processing and indexing sensor data within a road condition monitoring system. Operations of the method 400 may be performed by the modules described above with respect to FIG. 2, particularly the data collection module 202, data processing module 204, and analysis module 206.

At operation 402, the data collection module 202 receives sensor data from sensor devices equipped within a plurality of vehicles. The sensor devices include dash cameras configured to capture image data of road conditions and accelerometers configured to detect road surface conditions. In some examples, the vehicles may maintain a video buffer that can store up to 16 hours of footage enabling retrieval of historical data when needed. The sensor data collection frequency may be dynamically adjusted based on conditions, with increased collection in areas experiencing severe weather or poor coverage.

At operation 404, the data processing module 204 processes the sensor data using a machine learning model. For example, the model may be trained to detect and remove personally identifiable information including faces, license plates, and company logos from image data. In some examples, the model may evaluate image quality metrics to filter out poor quality captures and crops irrelevant portions of images. For accelerometer data, the model may analyze patterns to detect road surface conditions such as potholes or rough pavement. The processing may be performed both at the edge within vehicle devices and in the cloud depending on computational requirements.

At operation 406, the processed sensor data is indexed within the spatiotemporal index (i.e., the database 12) maintained by the data processing module 204. The spatiotemporal index associates the processed sensor data with corresponding road segments and timestamps. The system continuously monitors the age of indexed data and triggers collection of updated data when existing entries exceed predetermined freshness thresholds. For example, for highway segments, the system aims to maintain data freshness within one hour through automated update triggers.

FIG. 5 is a flowchart depicting a method 500 of maintaining data freshness within a road condition monitoring system, according to certain examples. Operations of the method 500 may be performed by the modules described above with respect to FIG. 2, particularly the data processing module 204 and analysis module 206.

At operation 502, the analysis module 206 evaluates timestamps of sensor data stored within the spatiotemporal index based on condition types and road attributes. The evaluation includes checking temporal metadata associated with sensor data entries to determine the age of road condition information across the monitored road network. For example, the freshness requirements vary based on the type of condition being monitored. For high-priority conditions, highway segments require updates within one hour due to rapidly changing traffic patterns, while severe weather conditions need frequent updates to maintain safety aware-ness. Construction zone status requires multiple updates throughout the day to track changes in work zones and lane closures.

For infrastructure-related conditions, the system applies different freshness thresholds based on the stability of the monitored features. As an illustrative example, bridge height clearances may be updated less frequently as they rarely change, while railroad crossing status requires daily valida-tion to ensure safety compliance. Road surface conditions like potholes may be monitored on a weekly basis unless severe weather events necessitate more frequent updates.

According to certain examples, the system dynamically adjusts monitoring frequency based on several factors. For vehicles carrying hazardous materials or operating under specific regulatory requirements, the system maintains stricter freshness thresholds for relevant route conditions. Weather severity in affected areas may trigger increased monitoring frequency, particularly during severe weather events that can rapidly change road conditions. The system also considers historical patterns of condition changes and regulatory compliance needs when determining appropriate update intervals.

At operation 504, the analysis module 206 determines that a timestamp of a most recent sensor data associated with a road segment transgresses a predefined threshold. This determination involves comparing the temporal metadata against freshness requirements, which may vary based on the type of road segment and criticality of conditions being monitored. When the most recent data for a segment exceeds the age threshold, the system initiates update procedures.

At operation 506, the data collection module 202 identi-fies vehicles from among the plurality of vehicles having new sensor data associated with the road segment. The system may leverage its network of vehicles equipped with dash cameras and other sensors to locate those that have recently traversed the identified road segment. In certain examples, the system accesses buffered video data stored on the vehicles, which may for example maintain up to 16 hours of footage.

At operation 508, the data processing module 204 updates the spatiotemporal index with the new sensor data. The newly collected sensor data is processed to remove person-ally identifiable information and evaluate quality metrics before being indexed. The update refreshes the temporal metadata for the road segment and ensures that current condition information is available for map overlay genera-tion.

Figure 6:
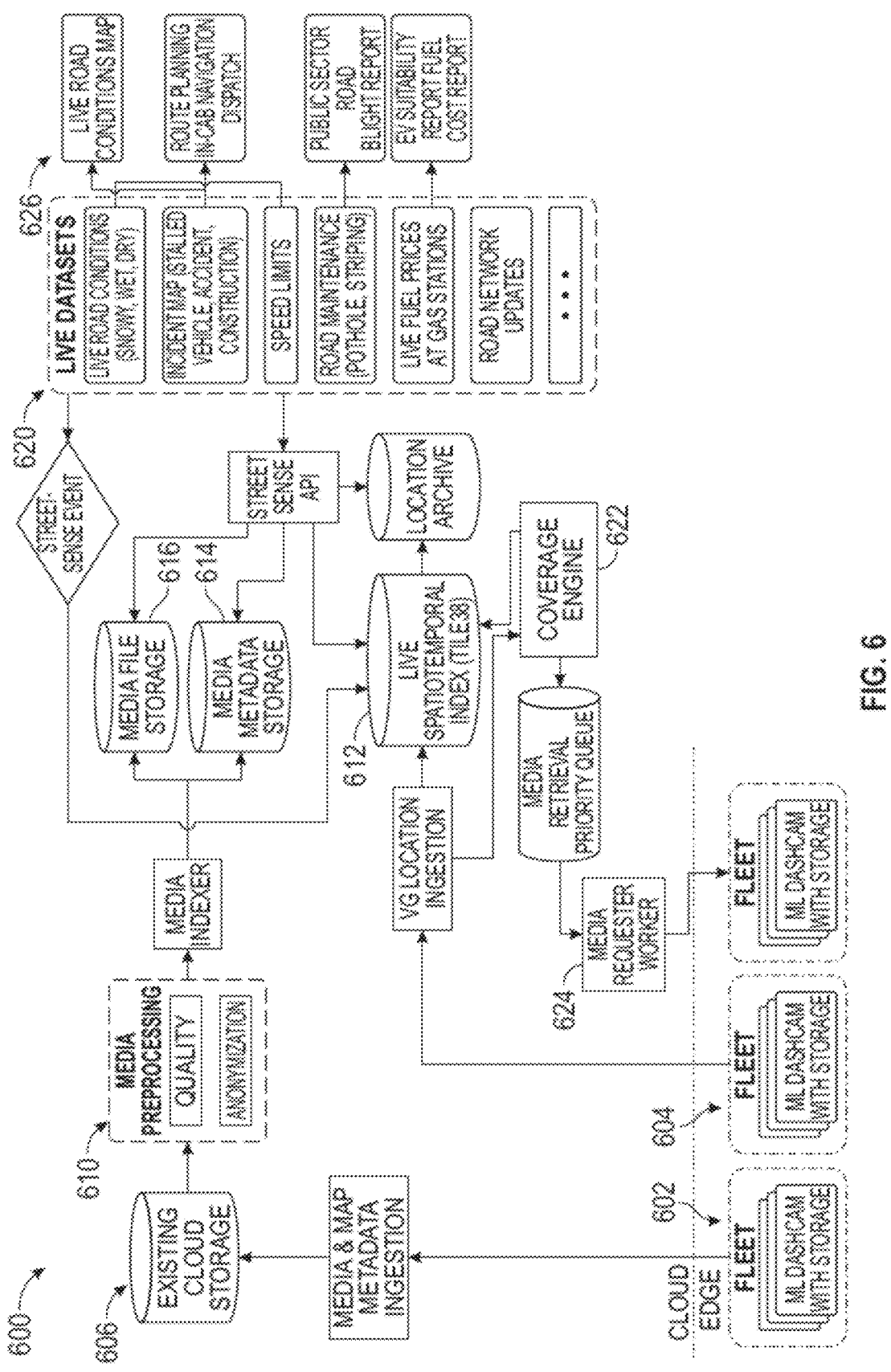
FIG. 6 is a block diagram illustrating a system architecture for collecting, processing, and presenting road condition data, according to certain examples.

FIG. 6 is a block diagram illustrating a system architec-ture 600 for collecting, processing, and presenting road condition data, according to certain examples. The system architecture 600 demonstrates the flow of data through multiple interconnected components that enable real-time monitoring and analysis of road conditions.

According to certain examples, the data flow begins at the fleet level 602, where multiple ML-enabled dashcams 604 with storage capabilities installed across fleet vehicles col-lect sensor data. These devices record into a video buffer that can store footage for extended periods, enabling retrieval of historical data when needed. The sensor devices perform processing to collect trip imagery, videos of relevant events, and identify potential points of interest.

From the fleet level 602, data flows through the cloud edge 624 to the cloud processing layer 606. As vehicle gateway (VG) locations are ingested, the system evaluates if traversed locations need additional image coverage, effi-ciently building coverage where possible and avoiding unnecessary compute where not feasible. The cloud pro-cessing layer 606 receives the sensor data from the ML-enabled dashcams 604 and processes it through several components. First, the ingested data undergoes media pre-processing 610, which includes quality assessment, anony-mization, and speed limit detection.

After preprocessing, the processed media is stored in a live spatiotemporal index 612, which maintains temporal and geospatial relationships between the processed sensor data and corresponding road segments. This index enables efficient retrieval of road condition information based on location and time. Meanwhile, an archiver 614 may transfer older images to a historical index 616 for long-term storage and reference.

The system implements dual processing pipelines: an offline dataset pipeline 618 handling road network updates and historical index maintenance, and a live dataset pipeline 620 that processes current data to detect road conditions, incidents, and fuel prices. The live dataset pipeline 620 employs machine learning models to analyze the processed sensor data to identify weather conditions, construction zones, road surface conditions, and infrastructure status.

A coverage engine 622 continuously monitors and improves system coverage by computing the priority of coverage needed by location according to several prioriti-zation factors: ephemeral importance (weather, hazards), location importance (frequency, intersections, landmarks), availability, age, and quality of existing imagery, vehicle suitability (proximity, heading, camera quality), and an anti-starvation mechanism (age in queue). When the cover-age engine 622 identifies areas with insufficient or outdated data, it works with a media requester 624 that maintains a prioritized list of locations requiring images.

The media requester 624 requests media according to dashcam connectivity and freshness and can scale media requests up and down to trade cost and freshness. For example, the media requester can identify vehicles that have recently traversed the identified road segments and retrieve the relevant footage from their video buffers.

The system outputs processed data 626 through various datasets and interfaces, including live road conditions maps showing current road surface states (snowy, wet, dry), incident maps displaying stalled vehicles, accidents, and construction zones, and road maintenance reports for issues like potholes and striping problems. These outputs are made available through a GUI, such as the GUI 700 depicted in FIG. 7, that allows users to select specific geographic areas and access detailed condition information through interac-tive map elements.

Throughout this process, the system continuously evalu-ates the age of stored sensor data and automatically triggers collection of updated information when existing data exceeds predetermined age thresholds, ensuring that the presented road condition information remains current and relevant.

Figure 7:
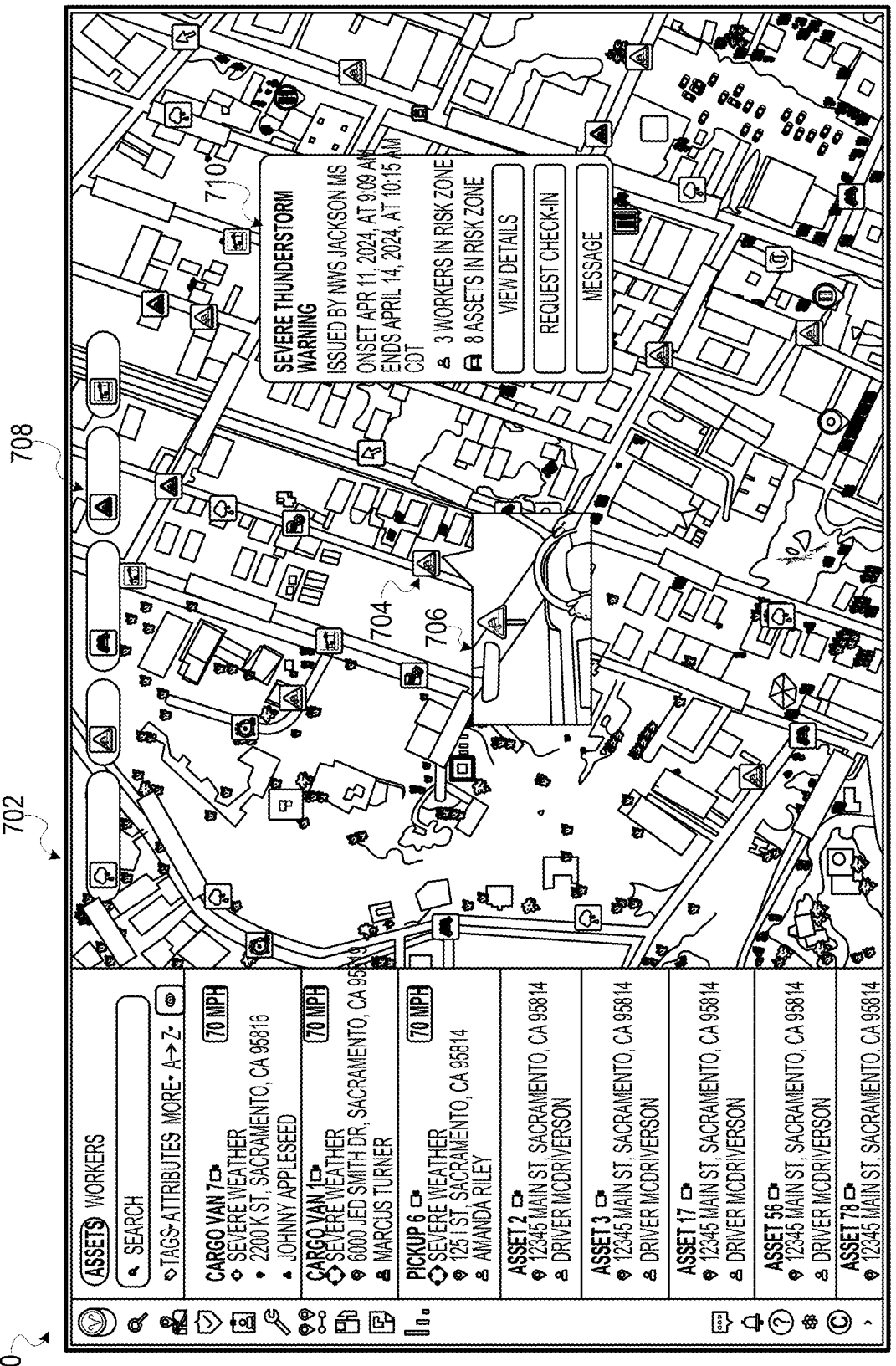
FIG. 7 is an interface diagram illustrating a graphical user interface (GUI) for displaying road condition information, according to certain examples.

FIG. 7 is an interface diagram illustrating a GUI 700 for displaying road condition information. The interface 700 includes a map view 702 showing a selected geographic area with various graphical indicators representing detected road network conditions.

In some examples, the map view 702 includes color-coded road segments that indicate different condition severi-ties. For example, roads affected by severe weather may be highlighted in blue, while construction zones appear in orange. Selectable icons 704 may be positioned along the road segments to indicate specific conditions, including weather hazards, construction zones, and infrastructure status.

In some examples, when a user selects one of the graphical indicators 704, the interface displays a condition details panel 706 showing processed sensor data associated with the selected location. The panel 706 may for example include recent images from dash cameras showing current conditions, timestamps indicating data freshness, and severity classifications. For example, for hazmat vehicles and school buses, the panel highlights regulatory requirements such as mandatory railroad crossing stops.

The interface includes a filtering panel 708 that enables customization based on user account information. Users can filter displayed conditions based on vehicle types, regulatory requirements, and operational regions. The panel also includes controls for adjusting the time period of displayed conditions.

In some examples, the interface includes an alert panel 710 that displays notifications about severe weather conditions and other hazards affecting the selected area. The alerts are customized based on vehicle types and regulatory requirements associated with the user account. Users can access detailed condition information through interactive elements within the alert panel.

Figure 8:
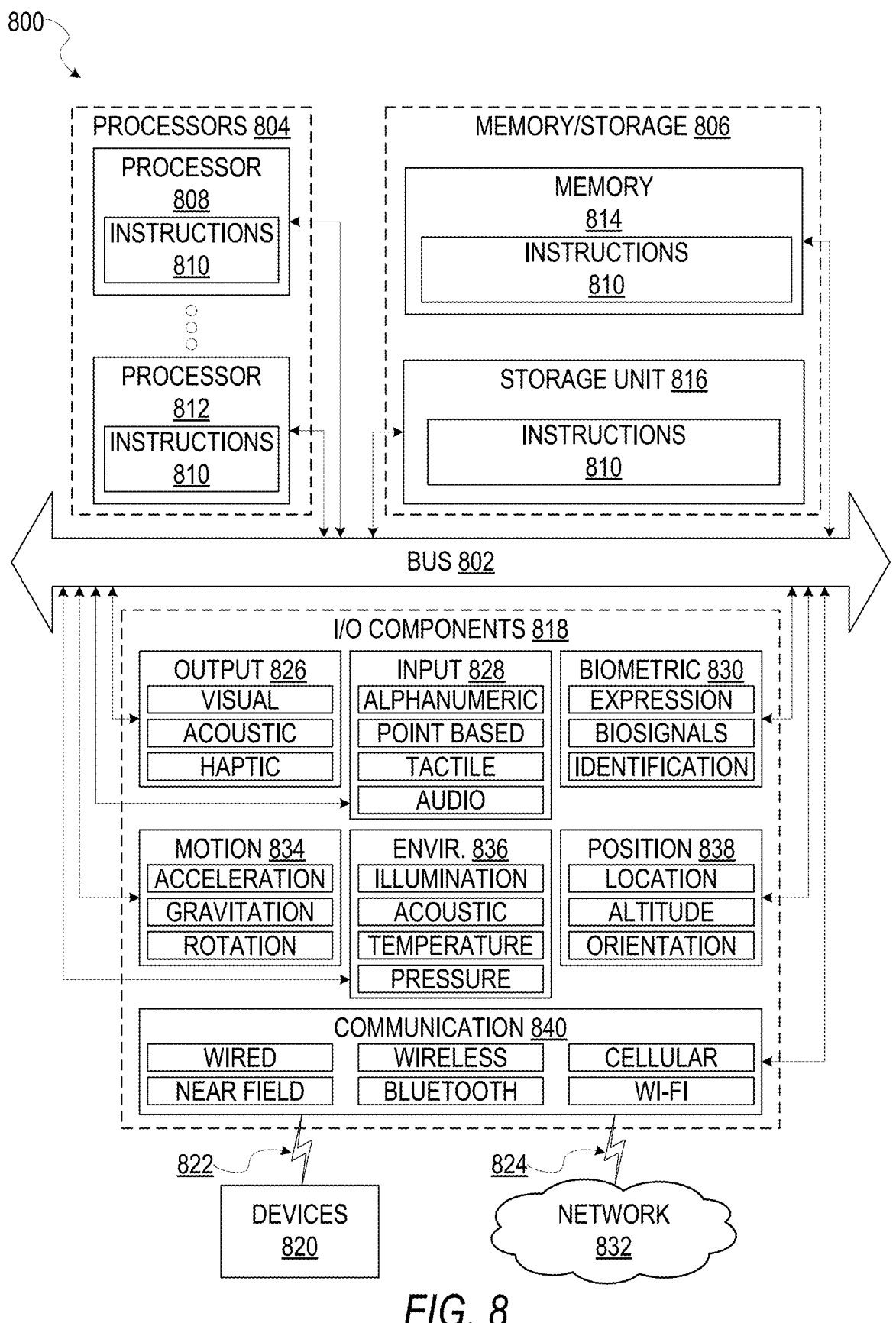
FIG. 8 is a block diagram illustrating components of a machine, according to some example embodiments, able to read instructions from a machine-readable medium (e.g., a machine-readable storage medium) and perform any one or more of the methodologies discussed herein.

FIG. 8 is a block diagram illustrating components of a machine 800, according to some example embodiments, able to read instructions from a machine-readable medium (e.g., a machine-readable storage medium) and perform the methodologies for road condition monitoring discussed herein. Specifically, FIG. 8 shows a diagrammatic representation of the machine 800 in the example form of a computer system, within which instructions 810 (e.g., software, a program, an application, an applet, an app, or other executable code) for causing the machine 800 to perform road network condition detection and analysis may be executed. The instructions 810 transform the general, non-programmed machine 800 into a particular machine 800 programmed to collect sensor data from vehicles, generate spatiotemporal indices, analyze road conditions, and generate map overlays. In a networked deployment, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), other smart devices, a web appliance, a network router, a network switch, a network bridge, or any machine capable of executing the instructions 810, sequentially or otherwise, that specify actions to be taken by machine 800.

The machine 800 includes processors 804 that execute instructions for the road condition monitoring system, including data collection, data processing, analysis and presentation modules. The memory/storage 806 may include a memory 814, such as a main memory, or other memory storage, and a storage unit 816, both accessible to the processors 804 such as via the bus 802. The storage unit 816 and memory 814 store the instructions 810 embodying any one or more of the methodologies or functions described herein. The instructions 810 may also reside, completely or partially, within the memory 814, within the storage unit 816, within at least one of the processors 804 (e.g., within the processor's cache memory), or any suitable combination thereof, during execution thereof by the machine 800. Accordingly, the memory 814, the storage unit 816, and the memory of processors 804 are examples of machine-readable media.

The I/O components 818 include components configured to receive sensor data from vehicle-mounted devices and provide map overlay outputs. The specific I/O components 818 that are included in a particular machine 800 will depend on the type of machine. For example, portable machines such as mobile phones will likely include a touch input device or other such input mechanisms, while a headless server machine will likely not include such a touch input device. The I/O components 818 are grouped according to functionality merely for simplifying the following discussion and the grouping is in no way limiting. In various example embodiments, the I/O components 818 may include output components 826 and input components 828. The output components 826 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 828 are configured to receive dash camera image data and accelerometer data from vehicles.

The I/O components 818 may include biometric components 830, motion components 834, environmental components 836, or position components 838 among a wide array of other components. For example, the biometric components 830 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 834 may include acceleration sensor components (e.g., accelerometer), gravitation sensor components, rotation sensor components (e.g., gyroscope), and so forth. The environment components 836 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 838 include GPS receivers for tracking vehicle locations associated with the sensor data.

Communication may be implemented using a wide variety of technologies. The I/O components 818 may include communication components 840 operable to couple the machine 800 to a network 832 or devices 820 via coupling 822 and coupling 824 respectively. For example, the communication components 840 may include a network interface component or other suitable device to interface with the network 832. In further examples, communication components 840 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 820 may be another machine or any of a wide variety of peripheral devices (e.g., a peripheral device coupled via a Universal Serial Bus (USB)). The communication components support transmission of sensor data, spatiotemporal indices, and map overlays between system components.

The communication components 840 may detect identifiers or include components operable to detect identifiers. For example, the communication components 840 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 840, such as, location via Internet Protocol (IP) geo-location, location via Wi-Fi® signal triangulation, location via detecting a NFC beacon signal that may indicate a particular location, and so forth. The components facilitate data collection from the distributed vehicle sensor network, enabling the system to maintain current road condition information across geographic areas. The components support transmission of live road condition data, incident reports, and other detected conditions to provide situational awareness for routing and operations.

GLOSSARY

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, net-books, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), World-wide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

What is claimed is:

1. A system comprising:

a memory;

a plurality of vehicles equipped with one or more sensor devices; and at least one hardware processor to perform operations comprising:

receiving sensor data from the one or more sensor devices equipped within the plurality of vehicles, the sensor data comprising at least temporal metadata;

generating a spatiotemporal index of the sensor data based on at least the temporal metadata of the sensor data;

receiving a request to display a map view of a selected geographic area;

accessing at least a portion of the sensor data from the spatiotemporal index based on the selected geographic area;

performing a comparison of the temporal metadata associated with the portion of the sensor data against a predefined threshold value that corresponds with the selected geographic area;

determining that the temporal metadata associated with the portion of the sensor data exceeds the predefined threshold value associated with the selected geographic area;

accessing new sensor data associated with the selected geographic area from the one or more sensor devices equipped within the plurality of vehicles based on the temporal metadata exceeding the predefined threshold;

determining a road network condition of the selected geographic area based on the new sensor data; and generating a map overlay for the selected geographic area, the map overlay comprising one or more graphical indicators that represent the detected road network condition.

2. The system of claim 1, wherein the one or more sensor devices comprise dash cameras configured to capture image data.

3. The system of claim 2, wherein the operations further comprise:

receiving the image data from the dash cameras; and processing the image data using a machine learning model trained to:

detect and remove personally identifiable information including faces, license plates, and company logos;

evaluate image quality metrics to filter out poor quality captures;

crop irrelevant portions of images.

4. The system of claim 1, wherein the one or more sensor devices include one or more accelerometers configured to detect road surface conditions.

5. The system of claim 1, further comprising:

receiving an input that selects a graphical indicator from among the one or more graphical indicators displayed in the map overlay;

accessing sensor data from the spatiotemporal index based on the graphical indicator; and causing display of a presentation of the sensor data.

6. The system of claim 1, wherein the receiving the request to display the map view of the selected geographic area comprises:

accessing user account information responsive to the request;

selecting a subset of the detected road network conditions based on the user account information; and wherein the one or more graphical indicators represent the subset of the detected road network conditions.

7. The system of claim 1, wherein the predefined threshold is selected from among a plurality of predefined threshold values based on a type of a road segment within the selected geographic area.

8. A method comprising:

receiving sensor data from one or more senor devices equipped within a plurality of vehicles, the sensor data comprising at least temporal metadata;

generating a spatiotemporal index of the sensor data based on at least the temporal metadata of the sensor data;

receiving a request to display a map view of a selected geographic area;

accessing at least a portion of the sensor data from the spatiotemporal index based on the selected geographic area;

performing a comparison of the temporal metadata associated with the portion of the sensor data against a predefined threshold value that corresponds with the selected geographic area;

determining that the temporal metadata associated with the portion of the sensor data exceeds the predefined threshold value associated with the selected geographic area;

accessing new sensor data associated with the selected geographic area from the one or more sensor devices equipped within the plurality of vehicles based on the temporal metadata exceeding the predefined threshold;

determining a road network condition of the selected geographic area based on the new sensor data; and generating a map overlay for the selected geographic area, the map overlay comprising one or more graphical indicators that represent the detected road network condition.

9. The method of claim 8, wherein the one or more sensor devices comprise dash cameras configured to capture image data.

10. The method of claim 9, further comprising:

receiving the image data from the dash cameras; and processing the image data using a machine learning model trained to:

detect and remove personally identifiable information including faces, license plates, and company logos;

evaluate image quality metrics to filter out poor quality captures;

crop irrelevant portions of images.

11. The method of claim 8, wherein the one or more sensor devices include one or more accelerometers configured to detect road surface conditions.

12. The method of claim 8, further comprising:

receiving an input that selects a graphical indicator from among the one or more graphical indicators displayed in the map overlay;

accessing sensor data from the spatiotemporal index based on the graphical indicator; and causing display of a presentation of the sensor data.

13. The method of claim 8, wherein the receiving the request to display the map view of the selected geographic area comprises:

accessing user account information responsive to the request;

selecting a subset of the detected road network conditions based on the user account information; and wherein the one or more graphical indicators represent the subset of the detected road network conditions.

14. The method of claim 8, wherein the predefined threshold is selected from among a plurality of predefined threshold values based on a type of a road segment within the selected geographic area.

15. A non-transitory machine-readable storage medium comprising instructions that, when executed by one or more processors of a machine, cause the machine to perform operations comprising:

receiving sensor data from one or more senor devices equipped within a plurality of vehicles, the sensor data comprising at least temporal metadata;

generating a spatiotemporal index of the sensor data based on at least the temporal metadata of the sensor data;

receiving a request to display a map view of a selected geographic area;

accessing at least a portion of the sensor data from the spatiotemporal index based on the selected geographic area;

performing a comparison of the temporal metadata associated with the portion of the sensor data against a predefined threshold value that corresponds with the selected geographic area;

determining that the temporal metadata associated with the portion of the sensor data exceeds the predefined threshold value associated with the selected geographic area;

accessing new sensor data associated with the selected geographic area from the one or more sensor devices equipped within the plurality of vehicles based on the temporal metadata exceeding the predefined threshold;

determining a road network condition of the selected geographic area based on the new sensor data; and generating a map overlay for the selected geographic area, the map overlay comprising one or more graphical indicators that represent the detected road network condition.

16. The non-transitory machine-readable storage medium of claim 15, wherein the one or more sensor devices comprise dash cameras configured to capture image data.

17. The non-transitory machine-readable storage medium of claim 16, further comprising:

receiving the image data from the dash cameras; and processing the image data using a machine learning model trained to:

detect and remove personally identifiable information including faces, license plates, and company logos;

evaluate image quality metrics to filter out poor quality captures;

crop irrelevant portions of images.

18. The non-transitory machine-readable storage medium of claim 15, wherein the one or more sensor devices include one or more accelerometers configured to detect road surface conditions.

19. The non-transitory machine-readable storage medium of claim 15, further comprising:

receiving an input that selects a graphical indicator from among the one or more graphical indicators displayed in the map overlay;

accessing sensor data from the spatiotemporal index based on the graphical indicator; and causing display of a presentation of the sensor data.

20. The non-transitory machine-readable storage medium of claim 15, wherein the receiving the request to display the map view of the selected geographic area comprises:

accessing user account information responsive to the request;

selecting a subset of the detected road network conditions based on the user account information; and wherein the one or more graphical indicators represent the subset of the detected road network conditions.

* * * * *